UNITED STATES PATENT OFFICE.

ADOLF FELDT, OF BERLIN-WILMERSDORF, WALTER SCHOELLER, OF BERLIN-WESTEND, AND ERICH BORGWARDT, OF BERLIN, GERMANY, ASSIGNORS TO CHEMISCHE FABRIK AUF ACTIEN (VORM. E. SCHERING), OF BERLIN, GERMANY.

HEAVY METAL MERCAPTO SULPHONIC COMPOUNDS.

No Drawing. Application filed December 10, 1925, Serial No. 74,632, and in Germany December 15, 1924.

Our invention relates to new chemical products adapted for pharmaceutical use and to the method of making same. It more particularly refers to the production of organic metallic mercapto sulphonic compounds which correspond to the formula

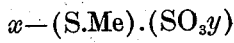

wherein $x$ is an aliphatic, or aromatic or heterocyclic radical, Me a heavy metal, and $y$ either H or a metal, preferably an alkali or alkali earth metal. The new compounds which are employed especially in the form of their water soluble alkali or alkali earth salts, are produced by the action of metallic salts upon mercapto sulphonic acids in an acid, neutral or feeble alkaline medium.

The invention is illustrated in the following examples, the parts being by weight:—

Example 1.

1 part of the potassium salt or mercaptobenzene-sulphonic acid (obtained from diazobenzene sulphonic acid and potassium sulphide, and reducing the disulphide obtained with aluminum amalgam to obtain a colourless crystalline powder easily soluble in water) is dissolved in 10 parts of water and a 10 percent solution of potassium aurobromide is added thereto until it no longer becomes de-coloured. On the addition of alcohol the potassium salt of para-auromercaptobenzenesulphonic acid separates out in yellow flakes. The salt which has a gold content of about 45 percent is purified by repeated precipitations. It is easily soluble in water. The final product has the following formula:—

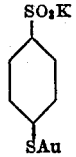

Example 2.

20 parts of 4-amino-2-mercaptobenzene-1-sulphonic acid (obtained from 4-nitro-2-diazobenzene-1-sulphonic acid and potassium sulpho cyanide and reducing the 4-nitro-2-thiocyanbenzene-1-sulphonic acid obtained to colourless crystalline leaves difficultly soluble in water) are mixed with 4 parts of water and brought into solution as a sodium salt by the addition of caustic soda. An amount of sodium sulphite corresponding to 1 molecule is now added and while stirring there is added 400 parts of 10 percent potassium aurobromide solution whereby the acid is precipitated as a slightly yellowish body which is barely soluble in cold water. It is filtered off, dissolved in caustic soda and precipitated as sodium salt by the addition of alcohol. It is a colourless powder easily soluble in water and has a gold content of about 44 percent, and the following structural formula:—

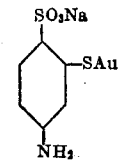

Example 3.

2.4 parts of 1-mercaptonaphthalene-4-sulphonic acid (see Berichte der deutschen chemischen Gesellschaft, vol. 32, page 1152) are dissolved in 5 percent hydrochloric acid whereupon a solution of 1.5 parts of aurichloride in 15 percent of water is slowly added. The auromercaptonaphthalene sulphonic acid precipitated is well washed with water and alcohol; it forms when dissolved in caustic soda and precipitated with alcohol a light yellow powder very easily soluble in water which has a gold content of about 41 percent. The structural formula of the final product is

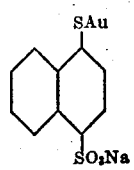

Example 4.

To 15 parts sodium gamma-thioglycerine-alpha-sulphonate (obtained from sodium gamma-chloroglycerine-alpha-sulphonate and sodium sulphhydrate) dissolved in 500 parts of water is added a solution of 8 parts of aurichloride and 70 parts of water. The gold compound is precipitated by the addition of 600 parts of alcohol as a nearly colourless powder easily soluble in water; the compound is purified by repeated precipitations. It has a gold content of about 49 percent, and the following formula:—

AuS.CH₂.CHOH.CH₂.SO₃Na

*Example 5.*

1 mol. sodium methanthioldisulphonate (see Annalen der Chemie, vol. 161, page 134) is dissolved in a little water and a 10 percent solution of ⅓ mol. of potassium aurobromide is slowly added. On the addition of the like volume of alcohol to the nearly colourless solution the auromercaptomethanedisulphonate of sodium is precipitated; this, after re-precipitation from water by alcohol, is easily obtained in a pure and white condition. The gold content of the compound, which crystallizes with 2 mol. A*q*, is about 41.5 percent, and the compound has the following formula:—

CH.(SAu).(SO₃Na)₂

*Example 6.*

Ortho-amino-para-sulphophenol is treated with potassium sulpho cyanide and so much water that it enters into solution by warming; the solution is evaporated to dryness. The mass is then carefully heated to about 150° C. whereupon, with the splitting off of ammonia and sulphuretted hydrogen, a ring formation to the potassium 2-mercaptooxazol-5-sulphonate takes place. This is extracted from the viscous mass with water and is a colourless product fairly soluble in water.

5 parts of potassium 2-mercaptooxazol-5-sulphonate in 25 parts of water are feebly acidified with dilute hydrochloric acid and then treated with so much potassium aurobromide solution as will be taken up quickly. The potassium 2-auromercaptooxazol-5-sulphonate produced is precipitated with alcohol in the form of a yellow powder very easily soluble in water. The gold content is about 41 percent, and the structural formula as follows:—

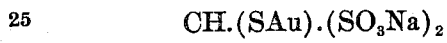

*Example 7.*

2 parts of 4-amino-2-mercaptobenzene-1-sulphonic acid are dissolved as the sodium salt in 10 parts of water and then treated with 17 parts of a 10 percent solution of silver nitrate. The light yellow acid precipitated is filtered off, dissolved in caustic soda and precipitated with alcohol as the sodium 4-amino-2-argentomercaptobenzene-1-sulphonate. The silver content is about 31 percent, and the structural formula as follows:—

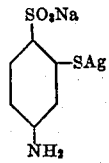

*Example 8.*

2 parts of sodium 4-amino-2-mercaptobenzene-1-sulphonate dissolved in 10 parts of water are treated with 1.3 parts of mercuric chloride in 20 parts of water. The precipitated colourless acid is filtered off, dissolved in caustic soda and precipitated with alcohol as the sodium salt of 4-amino-2-mercuricmercaptobenzene-1-sulphonic acid having a mercury content of about 29 percent. The final product has either of the following formulæ:—

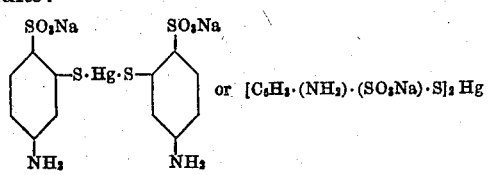

*Example 9.*

5 parts of sodium 4-amino-2-mercaptobenzene-1-sulphonate in 45 parts of water are treated with the calculated quantity of a solution of bismuth trichloride which is diluted with some acetic acid whereby the bismuth compound which corresponds to the formula (C₆H₃.NH₂.SO₃H.S)₃Bi precipitates as an orange yellow powder. The sodium salt of this compound is produced by dissolving in caustic soda and precipitating with alcohol. It is an orange yellow powder easily soluble in water and having a bismuth content of about 22 percent.

*Example 10.*

3 parts of iminomenthylene sodium sulphite-2-mercaptobenzene-1-sulphonic acid are dissolved in caustic soda and 30 parts of a ten percent solution of potassium aurobromide are added. The formed gold compound is sucked off, washed with water and transformed into the sodium salt by dissolving in caustic soda and precipitating with alcohol. It is a powder easily soluble in water and having a gold content of about 35 percent, and the following structural formula:—

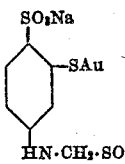

The sodium salt may also be obtained by causing formaldehyde sodium bisulphite to react upon the sodium salt of 4-amino-2-mercaptoaurobenzene-1-sulphonic acid described in example 2.

Other metallic compounds can be obtained in a similar manner by use of corresponding metallic salts. The process is generally applicable to mercapto organic compounds which contain sulphonic acid in the molecule.

We wish it to be understood that the production of the new compounds is not limited to the exact proportions and operations described, for obvious modifications will occur to a person skilled in the art.

We claim:—

1. As new products organic metallic mercapto sulphonic compounds, corresponding to the formula $$x-(S.Me).(SO_3y)$$

wherein $x$ is an aliphatic, or aromatic or heterocyclic radical, Me a heavy metal, and $y$ either H or a metal, preferably an alkali or alkali earth metal.

2. As a new product 4-amino-2-mercaptoaurobenzene-1-sulphonic acid, corresponding to the formula

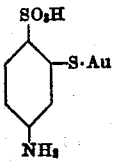

being a slightly yellowish compound difficultly soluble in cold water, forming soluble alkali and earth alkali salts, the sodium salt being a colourless powder easily soluble in water and having a gold content of about 44 per cent.

3. As a new product the disodium salt of 4-iminomethylene sulphurous acid-2-mercaptoaurobenzene-1-sulphonic acid, corresponding to the formula

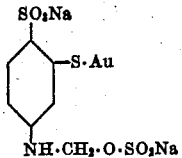

being easily soluble in water and having a gold content of about 35 percent.

4. The process which consists in causing a heavy metal salt to react upon a mercapto sulphonic acid compound.

5. The process which consists in causing a gold salt to react upon a mercapto sulphonic acid compound.

6. The process which consists in causing potassium aurobromide to react upon the sodium salt of 4-amino-2-mercaptobenzene-1-sulphonic acid.

7. The process which consists in causing potassium aurobromide to react upon the sodium salt of 4-amino-2-mercaptobenzene-1-sulphonic acid in presence of sodium sulphite.

8. The process which consists in causing potassium aurobromide to react upon 4-iminomethylene sodium sulphite-2-mercaptobenzene-1-sulphonic acid, dissolving the formed compound in caustic soda and precipitating with alcohol.

In testimony whereof we affix our signatures.

ADOLF FELDT.
WALTER SCHOELLER.
ERICH BORGWARDT.